United States Patent [19]

Cser

[11] Patent Number: 4,513,699
[45] Date of Patent: Apr. 30, 1985

[54] INTAKE GAS RESONANCE SYSTEM FOR INTERNAL COMBUSTION ENGINES

[75] Inventor: Gyula Cser, Budapest, Hungary

[73] Assignee: Autóipari Kutató és Fejlesztö Vállalat, Budapest, Hungary

[21] Appl. No.: 468,384

[22] Filed: Feb. 22, 1983

[51] Int. Cl.³ .............................................. F02B 37/04
[52] U.S. Cl. ................................................ 123/52 MB
[58] Field of Search ....................... 123/52 M, 52 MB

[56] References Cited

U.S. PATENT DOCUMENTS

| | | | |
|---|---|---|---|
| 3,796,048 | 3/1974 | Annus et al. | 123/52 M |
| 4,064,696 | 12/1977 | Cser | 123/52 M |
| 4,300,488 | 11/1981 | Cser | 123/52 MB |

Primary Examiner—Craig R. Feinberg
Attorney, Agent, or Firm—Spencer & Frank

[57] ABSTRACT

A multicylinder reciprocating piston type internal combustion engine has an intake gas resonance system associated with a group of engine cylinders whose suction strokes do not significantly overlap. The system includes a resonator vessel communicating with intake openings of the cylinders. The system further has a resonance tube communicating, with an end thereof, with the resonator vessel. The resonance tube has a length portion terminating at the resonator vessel and having cross-sectional areas increasing towards the resonator vessel. The cross-sectional area taken at the end of the resonance tube where it joins the resonator vessel is at least 1.2 times greater than the minimum cross section of the resonance tube. The distance between the end of the resonance tube joining the resonator vessel and an oppositely located inner wall face of the resonator vessel is greater than the diameter of a circle whose area equals the cross-sectional area taken at that end of the resonance tube. Further, the volume of a resonating space composed of the volumes of suction pipes connecting the cylinders with the resonator vessel, the volume of the resonator vessel and an average cylinder volume related to one cycle of oscillation and communicating with the resonator vessel during one oscillating cycle is at least 2.5 times greater than the volume of the resonance tube.

8 Claims, 3 Drawing Figures

INTAKE GAS RESONANCE SYSTEM FOR INTERNAL COMBUSTION ENGINES

BACKGROUND OF THE INVENTION

This invention relates to an intake gas resonance system for improving the intake gas supply of reciprocating piston-type internal combustion engines. In the system, for the purpose of increasing the charging of the cylinders with intake gas, a determined group of cylinders is coupled, as a unit, by means of a short suction pipe, to a resonator vessel and further, a resonance tube communicates with the resonator vessel.

Internal combustion engines of the reciprocating piston type are known wherein the intake gas supplying system, in order to increase the charging of the cylinders, utilizes the energy of the gas oscillations generated by the periodic suction effect of the engine cylinders. A conventional solution resides in the so-called suction pipe charging wherein the intake opening of each engine cylinder is coupled with a suction pipe/resonance tube or predetermined cross section and length. Such a system is discussed in an article by D. Broome, entitled "Induction Ram", in The Automobile Engineer/London GB/, 1969, issue 4-6. In such intake gas supplying systems the depression wave generated by the suction effect of the engine cylinder propagates—as known—close to the speed of sound along the length of the suction pipe and, at the open end thereof, it is reflected as a compression wave. As known, reflection is effected also at that pipe end which adjoins the intake opening of the cylinder; the amplitude of the wave reflected there, however, depends from the momentary flow passage cross section of the intake opening. If the back-and-forth travelling time of the wave, that is, the natural frequency of the gas column is appropriately tuned with the displacement of the respective engine piston, at the end of the intake cycle a compression wave reaches the cylinder and in this manner more intake air is driven at a higher pressure into the cylinder. The propagation time of the wave natural frequency is determined, in addition to the speed of propagation, which is close to the speed of sound, by the distance for a back-and-forth travel of the wave. Stated differently, the time of propagation is determined by the length of the suction pipe. Consequently, in an intake gas resonance system, the length of the suction pipe is one of the most important factors for improving the intake gas supply. The cross section of the suction pipe affects particularly the developing speed and thus the level of the kinetic energy present in the pipe due to the non-stationary oscillating process. The pipe cross section, dependent upon the given requirements, has a determinable optimum value.

For a favorable course of the oscillation phenomena a substantially uniform pipe cross section is needed because the compression waves are reflected not only from the open end of the pipe or from the so-called closed end which is adjoining the intake opening of the cylinder or from a partially closed pipe end, but reflection also takes place at all locations where the cross section of the pipe widens or narrows. This phenomenon is described on page 41 of a book authored by H. Seifert and entitled "Instationare Strömungsvorgange in Rohrleitungen an Verbrennungskraftmaschinen" (Non-Stationary Flow Phenomena in Pipe Conduits of Combustion Engines), published by Springer Verlag, 1962. The pipe length determined by the requirements for a favorable operation thus has to be ensured while maintaining the pipe cross section uniform.

In certain states of the oscillating process the velocity of the medium flowing in the suction pipe resonance tube changes direction and the medium flows out at the open end of the pipe. This results in a loss of the kinetic energy of the exiting air jet. Heretofore it was not practically feasible to reduce these losses.

It is, to be sure, thinkable to theoretically couple, to the suction pipe portion of uniform cross section, as a continuation thereof, a pipe portion which widens towards the open pipe end diffuser to make possible the recovery of one part of the lost kinetic energy. Such a diffuser, however, would even further increase the already inconveniently great length of the suction pipe. The length increase caused by the widening pipe portion would make the structural accommodation of the suction pipes and the entire intake gas supply system unfeasible in the space available next to the engine, under the hood of the vehicle. Consequently, such solutions have not been materialized in practice.

There are further known reciprocating piston-type internal combustion engines in which the intake gas system for improving the intake gas supply is so designed that between the intake opening of a determined group of cylinders and the resonance tube a resonator vessel of determined volume is arranged as described, for example, in Hungarian Pat. No. 161,323 and German Pat. No. 1,935,155. Such intake gas system is termed as a resonance system and the charging process itself is termed as resonance charging. The resonance charging may be advantageously used not only in naturally aspirating engines; the resonance intake gas system is also effective if arranged between the engine and a charging device such as a turbo supercharger. This type of arrangement is termed as combined charging.

The medium flowing in the resonance system is excited by the periodic suction effect of the group of those engine cylinders coupled to the resonator vessel, whose suction cycles do not significantly overlap one another. In case the frequency of the excitation equals the natural frequency of the resonance system, a resonance is generated in the intake gas system and the increased oscillations charge the engine cylinders to a significant extent.

At a given dimensional ratio between the individual elements of the resonance system the gas oscillations increase the charging of the cylinders not only for that rpm where resonance appears but also in a wide rpm range as described in Austrian Pat. No. 330,506 and British Pat. No. 1,400,059. It is to be noted that the greatest charging effect, however, appears at the resonance value. It is an advantageous property of the system that the resonance can be set not only for a high engine rpm but, with an appropriate alteration of the natural frequency of the resonance system, even at very low rpm's the intake gas supply may be improved without the system having an adverse effect on the operation of the engine at high rpm's.

The natural frequency of the medium flowing in the resonance system depends—as a departure from the earlier-mentioned suction pipe charging—not only from the length of the resonance tube of uniform cross section but also from its cross section and the dimension of the resonating volume. These relationships are discussed in an article by F. Anisits and F. Spinnler, entitled "Entwicklung der Kombinierten Aufladung am neuen Saurer-Fahrzeugdieselmotor D 4KT" (Developments of the Combined Charging in the New Saurer Vehicle Diesel Engine D 4KT), in Motor-Technische Zeitschrift, Stuttgart, FRG, 1978. issue 10. The dimensions and relationships required for obtaining the desired natural frequency and desired for a favorable operation—as discussed in Austrian Pat. No. 330.506—can be maintained, however, only under limitations which make a structural realization of the resonance system as well as the accommodation of the resonance system in the space available at the engine exceedingly difficult. The structural accommodation of the resonator vessels and particularly of the resonance tubes of predetermined dimensions became prime considerations in the practical application of the resonance system. Useful considerations to resolve various problems involved in this connection are discussed in Hungarian Pat. Nos. 173,034 and 175,875 as well as U.S. Pat. No. 4,064,696 as well as German Offenlegungsschrift No. 2,831,985. While the above-noted arrangements favorably utilize the space available adjacent an in-line six-cylinder engine, none of the solutions was able to address the problem of excessive dimensions required for a favorable operation. This means that the spatial requirement even of advantageously arranged structures is substantial which, in many cases, constitutes an obstacle for their practical application.

SUMMARY OF THE INVENTION

It is an object of the invention to provide an improved resonance system for supplying a reciprocating piston-type internal combustion engine with intake gas wherein the difficulties in accommodating such system in the space available under the vehicle hood are substantially eliminated. It is a further object of the invention to provide an improved internal combustion engine whose intake gas resonance system effectively improves the intake gas supply of the engine despite reduced dimensions for convenient installation. It is a further object of the invention to provide an improved resonance system of the above-outlined type whose weight and thus the overall weight of the engine as well as the manufacturing costs are significantly reduced.

The invention is based on the recognition that the installment dimensions of the resonance system—while observing the dimensional relationships noted earlier—can be reduced most effectively if the cross section of the resonance tube is reduced because then not only is the cross section smaller, but, for observing the desired dimensional relationships necessary for an effective operation, a shorter tube length and/or resonating volume is sufficient. It has to be noted, however, that the magnitude of the velocity or the dissipated kinetic energy of the intake gas exiting the resonance tube places a limit on the minimum cross section of the resonance tube. The extent of such an energy dissipation could, in certain cases, prohibitively increase the flow losses of the resonance system.

The above objects as well as others to become apparent as the specification progresses, are accomplished by the invention, according to which, briefly stated, the cross section of the resonance tube is gradually decreased along a length portion from at least that tube end which joins the resonator vessel. In this manner the average cross section of the resonance tube viewed along its entire length is significantly decreased, together with all other dimensions of the resonance system which affect its operation and which are significant from the point of view of accommodating the system under the hood, without increasing the flow losses of the intake gas travelling back and forth at high velocities in the resonance tube. Stated differently, the cross section of the resonance tube increases, with respect to the minimum tube cross section, towards the resonator vessel at the tube end portion adjoining the resonator vessel, whereby the gas velocity in the resonance tube is reduced due to the increased tube cross section. It is thus feasible to recuperate, in the resonance tube itself, a significant portion of the kinetic energy of the intake gas column, particularly, if it is ensured that the gas jet may flow into remote locations of the resonator vessel from the resonance tube without obstructions while it utilizes the kinetic energy fraction which is still available as the intake gas exits the resonance tube.

The interfering effect of the wave reflection caused by the outwardly increasing tube cross section is eliminated by designing the volume of the resonating space significantly greater than the volume of the resonating tube. A relatively large resonating volume is capable to absorb the gas quantities streaming thereinto from the resonance tube without significant restriction, collision or suppression, that is, without sudden pressure increase. In this manner, at the tube end no strong, determinative wave reflection takes place as it has been the case in suction pipe-type charging systems where the gas column moving in the suction pipe is in contact directly, thus, without the intermediary of a resonator vessel, with the intake opening of the cylinder. The slight, weak wave reflection which does occur, does not have a determinative effect on the natural frequency of the system even if the cross section of the resonance tube varies and thus the natural frequency remains a function of the entire tube length, including the length portions where the cross section varies, the average tube cross section and the resonating volume. Thus, contrary to known solutions, it is not necessary to increase the tube length—which is determinative for a favorable operation of the resonance system—by the tube sections flaring towards the tube ends. According to the invention, the cross section of the resonance tube at its flaring end or ends is at least 1.2 times the smallest cross section of the resonance tube. The cross section of the tube end is viewed as lying in a plane which is perpendicular to the longitudinal axis of the resonance tube. Further, the distance from the resonance tube end joining the resonator vessel to the oppositely located resonator vessel wall is, as measured along the longitudinal axis of the resonance tube, greater than the diameter of a circle whose area equals the cross-sectional area of the flared tube end. Further, the sum of the volume of the resonator vessel, the adjoining intake gas conduits and the average volume of each cylinder—related to one oscillating cycle—which communicates with the resonator vessel by means of its open intake opening is at least 2.5 times greater than the volume of the resonance tube. It is noted in this connection that the length of each suction pipe connecting the resonator vessel with the intake opening of the respective cylinder has a length which does not exceed n/1500 m, wherein n is the nominal engine rpm.

According to a further feature of the invention, at that tube end which is remote from the resonator vessel, the cross section of the resonance tube flares in a direction away from the resonator vessel and the cross section of that resonance tube end measured in a plane which is perpendicular to the longitudinal axis of the resonance tube is at least 1.2 times greater than the smallest cross section of the resonance tube.

According to a further feature of the invention, the cylinders of the internal combustion engine are divided into a plurality of cylinder groups, each being associated with a separate resonator vessel and at least one resonance tube. That end of each resonance tube which is remote from the resonator vessel opens into an equalizing vessel, wherein the distance measured from that resonance tube end to the opposite side wall of the equalizing vessel is, as measured along the respective resonance tube axes, greater than the diameter of a circle whose area equals the resonance tube cross section at that end thereof.

According to a further feature of the invention, the equalizing vessel communicates with the pressure side of a supercharger.

DESCRIPTION OF THE PREFERRED EMBODIMENT

Figure 1:
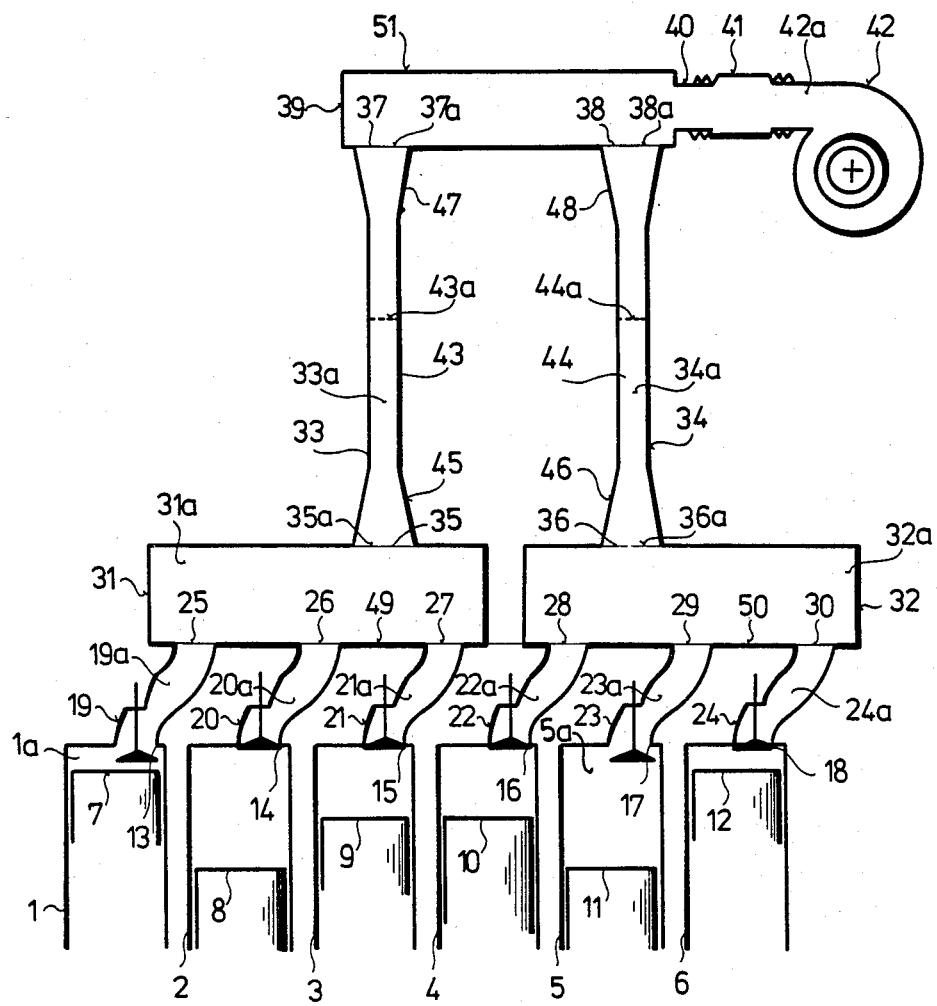
FIG. 1 is a schematic side elevational view of a preferred embodiment of the invention.

Turning to FIG. 1, there is schematically illustrated a reciprocating piston-type, four-cycle, six-cylinder in-line internal combustion engine comprising cylinders 1, 2, 3, 4, 5 and 6 with respective reciprocating pistons 7, 8, 9, 10, 11 and 12 accommodated therein. The cylinders 1 through 6 which have a conventional firing sequence of 1-5-3-6-2-4 have respective intake openings 13, 14, 15, 16, 17 and 18. The intake openings 13–18 are coupled to an intake gas resonance system for improving the charging of the cylinders 1–6 with intake gas. The total displacement volume of the engine is 12 liter (12 liter per cylinder) and further, the engine has a nominal rpm of 2200. Due to the four-cycle operational mode and the earlier-mentioned firing sequence, within the two groups formed, on the one hand, by cylinders, 1, 2 and 3 and, on the other hand, by cylinders 4, 5 and 6, for each firing interval the angular crankshaft displacement is 240°. The shaft angle through which each of the intake openings 13–18 are maintained open is selected to be 240° which then means that within the group formed of cylinders 1, 2 and 3 and within the group formed of cylinders 4, 5 and 6 the suction cycles of the individual cylinders do not overlap.

The two cylinder groups are coupled to two separate resonance systems. Thus, the intake openings 13, 14 and 15 of the cylinders 1, 2 and 3 are coupled by means of respective suction pipes 19, 20 and 21 with a resonator vessel 31 of one resonance system, whereas the intake openings 16, 17 and 18 of the cylinders 4, 5 and 6 are coupled by respective suction pipes 22, 23 and 24 with a resonator vessel 32 of another resonance system. The length of the suction pipes 19–24 from the intake openings 13–18 to their respective cross section 25, 26, 27, 28, 29 and 30 where they open into the respective resonator vessels 31 or 32, if 0.2 m. Such length is less than $n/1500 = 1.46$ m where $n=2200$ nominal rpm, whereas 1500 is an experimentally determined constant.

An end 35 of a resonance tube 33 is arranged in that wall of the resonator vessel 33 which is opposite the resonator vessel wall 49 containing the cross sections of ends 25–27 of the respective suction pipes 19–21. Similarly, an end 36 of a resonance tube 34 is arranged in that wall of the resonator vessel 32 which is opposite the resonator vessel wall 50 containing the cross sections of ends 28–30 of the suction pipes 22–24. The resonance tubes 33 and 34 open, with their respective ends 37 and 38, into a common equalizing vessel 39.

The pressure side 42a of a charging device 42 is coupled to an inlet opening 40 of the equalizing vessel 39 with the intermediary of a coupling pipe 41. The charging device 42 may be an exhaust gas driven turbo supercharger. It will be understood that other types of charging devices may be used.

The periodic suction effect of the cylinders 1, 2 and 3 causes oscillations of the intake gas flowing in the intake gas resonance system formed of the resonance vessel 31 and the adjoining resonance tube 33 coupled to the intake openings 13, 14 and 15 by the suction pipes 19, 20 and 21. In view of the fact that the cylinders 1, 2 and 3 coupled to the resonating vessel 31 have a firing interval which corresponds to 240° of rotation of the crankshaft, the suction effects generated by the pistons 7, 8 and 9 are also 240° apart. Thus, in the generated gas oscillations the duration of one cycle corresponds to 240° rotation of the crankshaft, independently from the momentary rpm. The intake openings 13, 14 and 15 are maintained open through an angle of 240°, that is, they are open during an entire oscillating cycle. Therefore, in the course of each oscillating cycle only a single one of the three cylinders 1, 2 and 3 is in communication at any one time with the resonator vessel 31. At the moment depicted in FIG. 1 it is the cylinder 1 which communicates with the resonator vessel 31 through the open intake opening 13. It is noted that the cylinder 1 communicating with the resonator vessel 31 through the momentarily open intake opening 13 has an average volume 1a which, related to an entire oscillating cycle, is identical to the simple algebraic average of the cylinder volumes formed during a 240° shaft rotation from the moment of opening to the moment of closing of the intake opening 13. In case the open period of the intake opening 13 is selected to be shorter than the duration of one cycle, thus, in the described embodiment, it is selected, for example, to be open only through a shaft rotation of 200° rather than 240°, the cylinder volume generated during the 200° turn has to be considered inasmuch as the remaining 40° of turn the cylinder 1 does not communicate with the resonator vessel 31 through the intake opening 13.

Further, at the moment depicted in FIG. 1, it is the cylinder 5 which communicates with the resonator vessel 32 through the open intake opening 17. In this case, the average volume 5a, related to an entire cycle of oscillation, of the cylinder 5 communicating with the resonator vessel 32 through the open intake opening 17 equals the simple algebraic average of the cylinder volumes generated during the 240° turn from the opening to the closing of the intake opening 17.

In practical applications, it may occur that the open period of the intake openings 13–18 is longer than one cycle of oscillation. This would be the case in the described embodiment if the intake openings 13–18 remain open beyond a crankshaft turn of 240°. If, for example, a 260° open period is chosen then a 20° overlap is generated between the suction periods of the individual cylinders 1–6. In such a case for determining the average cylinder volume it has to be considered that during a 20° overlap, among the cylinders 1, 2, 3 on the one hand and 4, 5, 6 on the other hand there are always two cylinders which simultaneously communicate with the resonator vessels 31 and 32 respectively, since of the intake openings 13, 14, 15 on the one hand and 16, 17 and 18 on the other hand, at all times two intake openings are simultaneously open.

The average cylinder volume 1a as defined above, the volume 19a of the suction pipe 19, the volumes 20a and 21a of the suction pipes 20 and 21 which, even in the closed position of the intake openings 14 and 15 communicate with the resonator vessel 31 as well as the volume 31a of the resonator vessel 31 together form a resonating volume V of the intake gas resonance system associated with the cylinder group formed of cylinders 1, 2 and 3. In the described embodiment the resonating volume V thus representing the sum of the volumes 1a, 19a, 20a, 21a and 31a is 10 liters.

Similarly, the average cylinder volume 5a, the volume 23a of the suction pipe 23, the volumes 22a and 24a of the suction pipes 22 and 24 communicating with the resonator vessel 32 even in the just-closed position of the intake openings 16 and 18 as well as the volume 32a of the resonator vessel 32 together constitute a resonating volume V of the intake gas resonance system associated with the cylinder group formed of cylinders 4, 5 and 6. The resonating volume V thus representing the sum of the volumes 5a, 22a, 23a, 24a and 32a is in the given example also 10 liter.

The resonance tube 33 coupled to the resonator vessel 31 and the resonance tube 34 coupled to the resonator vessel 32 are so designed that they each have a central tube portion 43 and 44 which have a minimum resonance tube cross section of 43a and 44a respectively which, in the described embodiment is 16 cm² each. The resonance tubes 33 and 34 have, at both ends, end portions 45, 47 and, respectively, 46, 48 whose cross sections widen towards the respective tube ends. Thus, the tube portion 43 of the resonance tube 33 is adjoined by a tube portion 45 of widening cross section so that the cross section 35a of the tube end 35 communicating with the resonator vessel 31 is greater than the cross section 43a of the tube portion 43 of minimum cross section. The tube end 37 situated remote from the resonator vessel 31 has a similar design. Thus, the tube portion 43 of minimum cross section is adjoined in the direction oriented away from the resonator vessel 31, by a tube portion 47 whose cross section increases towards the tube end 37. Accordingly, the cross section 37a of the tube end 37 is greater than the cross section 43a of the tube portion 43 of minimum cross section.

The favorable effect expected from the cross-sectional flaring of the resonance tube 33 will prevail if the magnitude of the cross sections 35a or 37a are each at least 1.2 times greater than the minimum cross section 43a. For the best results, it is however, expedient to select the cross sections to be of a greater value. Thus, for example, in the described embodiment, each of the cross sections 35a and 37a are 1.6 times greater than the cross section 43a, each thus amounting to 25.6 cm². The same measurements and ratios apply to the cross sections 36a and 38a of the respective ends 36 and 38 of the resonance tube 34. The cross sections 36a and 38a are connected by the tube portions 46 and 48 of flaring cross section with the tube portion 44 having the minimum cross section 44a.

The end-to-end length of each resonance tube 33 and 34 is so selected that the intake gas resonance system is the most effective in improving the charging of the cylinders with intake gas at an rpm which is smaller than one-half of the nominal rpm which in the present example is 1000 rpm (the nominal rpm being 2200 as noted earlier). Thus, the exciting frequency of the suction periods of cylinders 1–3 and 4–6 respectively, effects a resonance in the intake gas resonance system at the above-noted engine rpm of 1000. To obtain this result, the length of the resonance tubes 33 and 34 is 0.73 m, their volume 33a and 34a is 1.2 liter at the earlier-noted values for the cross sections 43a, 44a, 35a, 37a, 36a and 38a. The tube portions 45, 47, 46 and 48 have the shape of straight frustocones. The volume of the earlier defined resonating space V is thus 8.4 times greater than the volume 33a and 34a of the respective resonance tubes 33 and 34.

In order to ensure a favorable flow of the intake gas, the resonator vessel 31 is so designed at the junction of the tube end 35 of the resonance tube 33 that the distance between the oppositely located resonator wall 49 and the cross section 35a of the tube end 35 is greater than the diameter of the cross section 35a; such distance is 0.08 m in the described embodiment. It is noted that the cross section 35a is taken in a plane perpendicular to the longitudinal axis of the resonance tube 33 and that the distance is measured along that axis.

Similarly, the resonator vessel 32 is so designed that the distance between the circular cross section 36a of the end 36 of the resonance tube 34 and the oppositely located resonator wall 50 is greater than the diameter of the cross section 36a; in the described embodiment such a distance is 0.08 m. Again, the circular cross section 36a lies, at the tube end 36, in a plane perpendicular to the longitudinal axis of the resonance tube 34.

For further ensuring a favorable intake gas flow, the equalizing vessel 39 is so designed at the junction with the tube end 37 of the resonance tube 33 that the distance between the cross section 37a of the tube end 37 and the oppositely located equalizing vessel wall 51 is greater than the diameter of the cross section 37a; such a distance is 0.08 m in the described embodiment. It is noted that the cross section 37a at the tube end 37 is taken in a plane which is perpendicular to the axis of the resonance tube 33 and that the distance is measured along that axis.

The equalizing vessel 39 is similarly designed at the junction of the tube end 38 of the resonance tube 34. Thus, the distance between the cross section 38a and the oppositely located equalizing vessel wall 51 is greater than the diameter of the cross section 38a; such distance is 0.08 m in the described embodiment. Again, the cross section 38a is taken in a plane which is perpendicular to the axis of the resonance tube 34 and the distance is measured along that axis.

Figure 2:
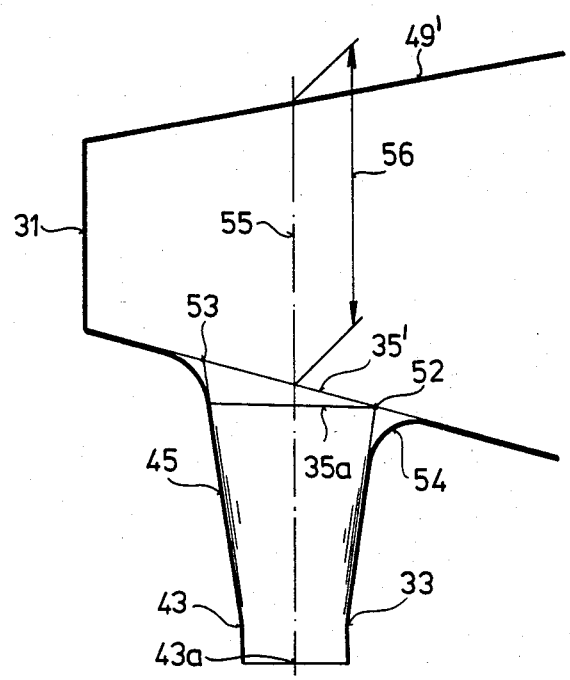
FIG. 2 is an enlarged schematic elevational view of a modified part of the structure shown in FIG. 1.

Turning now to FIG. 2, there is shown a variant of the location of junction between the resonance tube 33 and the resonator vessel 31. In this arrangement neither the tube end 35' nor the oppositely located vessel wall 49' is perpendicular to the central axis 55 of the resonance tube 33. The tube end 35' has a rounded portion 54 which is disregarded in the determination of dimensions. The tube end 35' is understood to extend here to the line of intersection between the generatrix of the respective wall of the resonator vessel 31 and the generatrix of the tube portion 45. The extreme points of these intersecting lines are constituted by intersections 52 and 53 between the above-noted generatrices. In this arrangement, the cross section of the tube end 35 is understood to mean the cross section 35a which lies in a plane that is perpendicular to the axis 55 and contains the points 52. The distance 56 from the tube end 35' to the resonator vessel wall 49' is the distance represented by a straight line extending along the axis 55 from the vessel wall 49' to a straight line connecting the points 52 and 53 with one another.

Figure 3:
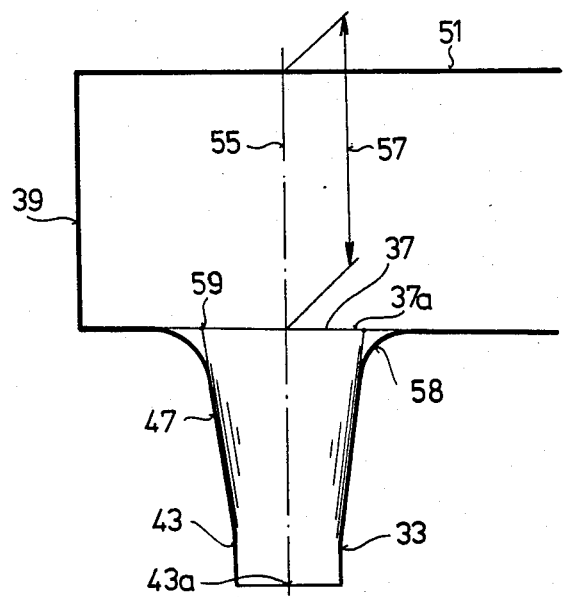
FIG. 3 is an enlarged schematic side elevational view of another part of the structure shown in FIG. 1.

Turning now to FIG. 3, there is shown at an enlarged scale, the zone of junction between the resonance tube 33 and the equalizing vessel 39. The tube end 37 has a rounded portion 58 which is disregarded in determining the dimensions. The tube end 37 is intended to mean the intersection between the generatrices of the equalizing vessel 39 and the tube portion 47. A point of intersection of two such generatrices is designated at 59. The distance between the equalizing vessel wall 51 and the tube end 37 is designated at 57.

Reverting once again to FIG. 1, it is noted that the suction pipes 19-24 are not essential for the operation of the system and therefore a construction is thinkable where the intake openings and cross sections 13, 25 or 14, 26 or 15, 27 coincide and thus the resonator vessel 31 is directly coupled to the intake openings 13, 14 and 15 of the respective cylinders 1, 2 and 3 and, similarly, the resonator vessel 32 is directly coupled to the intake openings 16, 17 and 18 of the respective cylinders 4, 5 and 6.

It is further noted that for practicing the invention it is not indispensable that the tube portions 45, 46, 47 and 48 have a continuously increasing cross section. Favorable solutions may be obtained if the increase of the cross section is composed of a plurality of flaring tube portions which could, for example, alternate with tube portions of constant cross section. It may further be advantageous if the cross-sectional increase of the tube portions 45 through 48 do not extend entirely to the respective tube ends 35 through 38 but, in their vicinity, the increased cross section remains at an approximately constant value. This permits a structurally and technologically simplified design of the joining of the resonance tubes 33 and 34 with the resonator vessels 31 and 32 and with the equalizing vessel 39.

Further, for practicing the invention in an engine having no charging device (such as a supercharger), it is not indispensable for the two ends 35, 37 and 36, 38 of the respective resonance tubes 33 and 34 to have identical configuration. In a structure where the tube ends 37 and 38 open directly into the atmosphere, it may be advantageous to design only the tube portions 45 and 46 with increasing cross sections.

In the description which follows, the mode of operation of an internal combustion engine incorporating the abovedescribed intake gas resonance system for improving the charging of cylinders will be set forth.

Due to the excitation generated by the periodic suction effect of the cylinders 1, 2 and 3, there occurs a pressure oscillation in the resonating space formed of the volume 31a of the resonator vessel 31, the volumes 19a, 20a and 21a of the respective suction pipes 19, 20 and 21 as well as the average volume 1a, related to one cycle of oscillation, of the cylinder 1 communicating with the suction pipe 19 through the open intake opening 13, as depicted in FIG. 1. In view of the fact that the most remote locations of the resonating space, that is, the resonator vessel 31 and the cylinder space 1a are connected with one another by means of suction pipes 19, 20 and 21 whose length is at the most n/1500, in the entirety of the resonating space the pressure varies identically in time, that is, an appreciable phase shift in the resonating space cannot occur. The periodic pressure changes in the resonator vessel 31 accelerate and decelerate the intake gas flowing in the resonance tube 33. As a result of the effect of the excitation, the intake gas, during the first half of the suction stroke, accelerates towards the resonator vessel 31, and the work input of the excitation increases the kinetic energy of the intake gas flowing in the resonance tube 33. The intake gas column accelerated to a high speed in the resonance tube 33 fills the resonating space in the second half of the suction stroke to such an extent that the pressure increases significantly in the resonating space and, as a result the intake gas charge of the cylinder 1 increases accordingly. In the tube portion 43 of the resonance tube 33, because of the 30-70% reduction in the cross section, very high speeds prevail and for this reason the kinetic energy level desired for the proper operation may be achieved with a relatively short resonance tube 33. The gas velocity that developed in the tube portion 43 is decelerated in the tube portion 45 of flaring cross section and thus the very high gas velocity is converted to pressure before the gas enters the resonator vessel 31. Thus, the flaring tube portion 45 may be regarded as a "diffusor" tube portion. The gas velocity required for setting the large oscillating energy levels will not be lost as the intake gas enters into the resonator vessel 31 but can be recuperated to a great measure and thus the flow losses of the intake gas resonance system do not increase. The interfering effect of the wave reflection occurring at the tube portions 45 and 47 of increasing cross section is eliminated by designing the resonating space V significantly greater, 8.4 times in the example, than the volume of the intake gas flowing in the resonance tube 31. Due to the large intake gas quantity prevailing or flowing in the resonating space there will be no abrupt pressure change and at the tube ends 35 and 37—and also in the tube portions 45 and 47—the wave reflection has a negligible effect. Thus, in the resonance tube 33 of non-uniform cross section approximately the same oscillation effect may be achieved as in known resonance tubes of uniform cross section. The residual kinetic energy of the already decelerated intake gas exiting from the tube end 35 is utilized for filling the resonating space V by providing that the tube end 35 is at an appropriate distance from the oppositely located vessel wall 49 of the resonator vessel 31. Accordingly, the kinetic energy of the free jet leaving the tube end 35 is sufficient for introducing the intake gas into the more remote parts of the resonator vessel 31; thus, for such an occurrence, additional energy input—which would manifest in losses—is not necessary. The described effect may be increased by decreasing the minimum cross section 43a of the resonance tube 33. The greater the rate of cross-sectional increase in the tube portion 45, the greater the increase of the effect described. As it has been found in numerous tests, a particularly good operation can be expected if the cross section 35a is at least 1.2 times greater than the minimum resonance tube cross section 43a. In the described embodiment, the cross section 35a is 1.6 times greater than the minimum cross section 43a. Given this ratio, the minimum cross section 43a of the resonance tube 33 could be decreased to such an extent that for achieving a resonance tuned to a very low engine revolution (1000 rpm) there is needed a resonance tube 33 of a length of only 0.73 m. A similar result in known intake gas resonance systems could have been achieved only with an approximately 50% longer resonance tube. The size reduction achievable for the resonance tube 33 makes possible a 30–40% reduction of the volume 31a of the resonator vessel 31 as compared to known solutions. It is noted that the volume reduction should not be such that the resonating space V is smaller than 2.5 times the volume of the resonance tube 33 because than an interfering effect of the wave reflection at the tube portion 45 of increasing cross section could no longer be avoided. Similar phenomena take place in the resonator vessel 32 and in the resonance tube 34 by virtue of the excitation generated in the suction pipes 22, 23 and 24 by the periodic suction effect of the cylinders 4, 5 and 6.

From the ends 37 and 38 of the respective resonance tubes 33 and 34 the intake gas flows into the equalizing vessel 39. Intake gas is introduced into the system from the outside by the charging device 42 which supplies, through the connecting pipe 41, intake gas to the inlet opening 40 of the equalizing vessel 39. The latter, by virtue of its large volume, dampens the pressure fluctuations prevailing therein.

It will be understood that the above description of the present invention is susceptible to various modifications, changes and adaptations, and the same are intended to be comprehended within the meaning and range of equivalents of the appended claims.

What is claimed is:

1. In a reciprocating piston type internal combustion engine having a plurality of engine cylinders each including an intake opening; an intake gas resonance system associated with a group of the engine cylinders whose suction strokes do not significantly overlap; said intake gas resonance system comprising:
   (a) a resonator vessel communicating with the intake openings of the cylinders of said group; said resonator vessel having a volume and an inner wall face;
   (b) a resonance tube having an end operatively coupled to said resonator vessel for communicating therewith; said resonance tube having a longitudinal axis and a volume; said end of said resonance tube being located opposite said inner wall face of said resonator vessel; the distance between said end of said resonance tube and said inner wall face of said resonator vessel as measured along said longitudinal axis of said resonance tube being greater than the diameter of a circle whose area equals the cross-sectional area taken at said end of said resonance tube; said resonance tube having a diffusor means for reducing velocities of gases passing through said resonance tube into said resonator vessel; said diffusor means comprising a gradually widening diffusor portion forming part of said resonance tube and terminating in said end; said diffusor portion having cross-sectional areas continuously increasing towards said resonator vessel; a cross-sectional area taken at said end of the resonance tube perpendicularly to said longitudinal axis being at least 1.2 times greater than a cross section of minimum area of said diffusor portion with said cross section being substantially spaced from said end; and
   (c) a resonating space having a volume composed of said volume of said resonator vessel and an average cylinder volume related to one cycle of oscillation and communicating with said resonator vessel during one oscillating cycle; said volume of said resonating space being at least 2.5 times greater than said volume of said resonance tube.

2. An internal combustion engine as defined in claim 5, wherein said diffusor portion is a first diffusor portion, further wherein said resonance tube has a second diffusor portion flaring away from said resonator vessel; said second diffusor portion having cross-sectional areas increasing in a direction away from said resonator vessel; said second diffusor portion having an end oriented away from said first diffusor portion; and further wherein a cross-sectional area taken at said end of said second diffusor portion perpendicularly to said longitudinal axis is at least 1.2 times greater than said cross section of minimum area.

3. An internal combustion engine as defined in claim 1, further comprising suction pipes connecting the intake openings of the cylinders with said resonator vessel; each suction pipe having a volume and each having a length in meters not exceeding a nominal engine rpm divided by 1500; the volumes of the suction pipes being comprised in said volume of said resonating space.

4. An internal combustion engine as defined in claim 1, wherein said resonance tube has a length portion of uniform cross section adjoining said diffusor portion; the area of said uniform cross section equalling that of said minimum area.

5. An internal combustion engine as defined in claim 1, wherein the diffusor portion has the shape of a straight frustocone.

6. An internal combustion engine as defined in claim 1, wherein said diffusor portion joins said resonator vessel with a rounded terminus.

7. An internal combustion engine as defined in claim 1, further wherein the engine cylinders form a plurality of groups of cylinders whose suction strokes do not significantly overlap; said intake gas resonance system being duplicated for each of said groups; the resonance tubes of each intake gas resonance system communicating, with another end remote from the respective resonator vessel, with a common equalizing vessel having an inner wall face located opposite each said other end; the distance between said other end of each resonance tube and said inner wall face of said equalizing vessel as measured along the longitudinal axis of the respective resonance tubes is greater than the diameter of a circle whose area equals the cross-sectional area taken at said other end of the resonance tubes.

8. An internal combustion engine as defined in claim 7, further comprising an intake gas charging device having a pressure side coupled to said equalizing vessel.

* * * * *

UNITED STATES PATENT AND TRADEMARK OFFICE
CERTIFICATE OF CORRECTION

PATENT NO. : 4,513,699

DATED : April 30, 1985

INVENTOR(S) : Gyula Cser

It is certified that error appears in the above-identified patent and that said Letters Patent is hereby corrected as shown below:

Column 4, line 58, cancel "It is noted in this connection that the length".

Column 4, lines 59-62, cancel in their entirety.

Column 5, line 63, change "if" to --is--.

Column 5, line 63, cancel "Such length is less than".

Column 5, lines 64 and 65, cancel in their entirety.

Column 9, line 66, cancel "whose length is at the most n/1500".

Signed and Sealed this

Eighth Day of September, 1987

*Attest:*

DONALD J. QUIGG

*Attesting Officer*  *Commissioner of Patents and Trademarks*